E. SAUTER.
SHEARING MACHINE.
APPLICATION FILED AUG. 3, 1911.
1,045,802.
Patented Nov. 26, 1912.
3 SHEETS—SHEET 2.
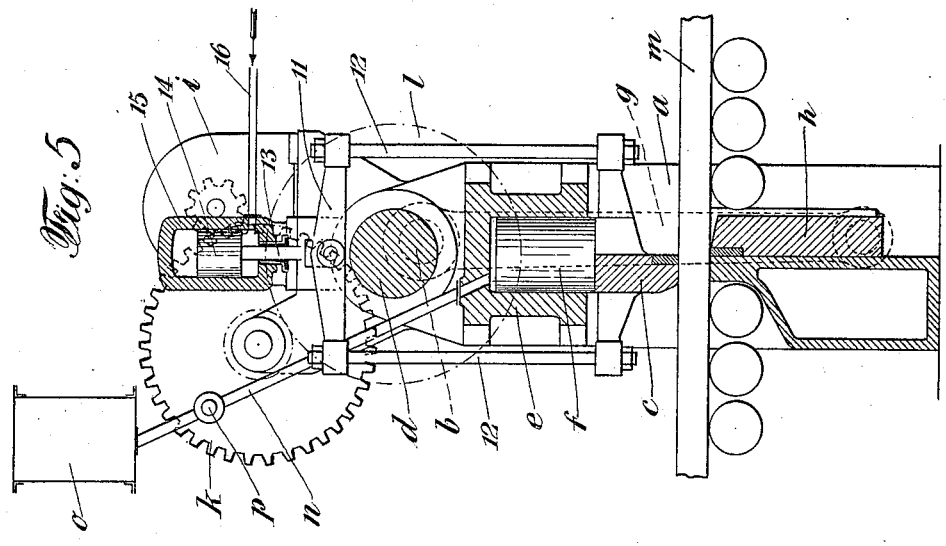
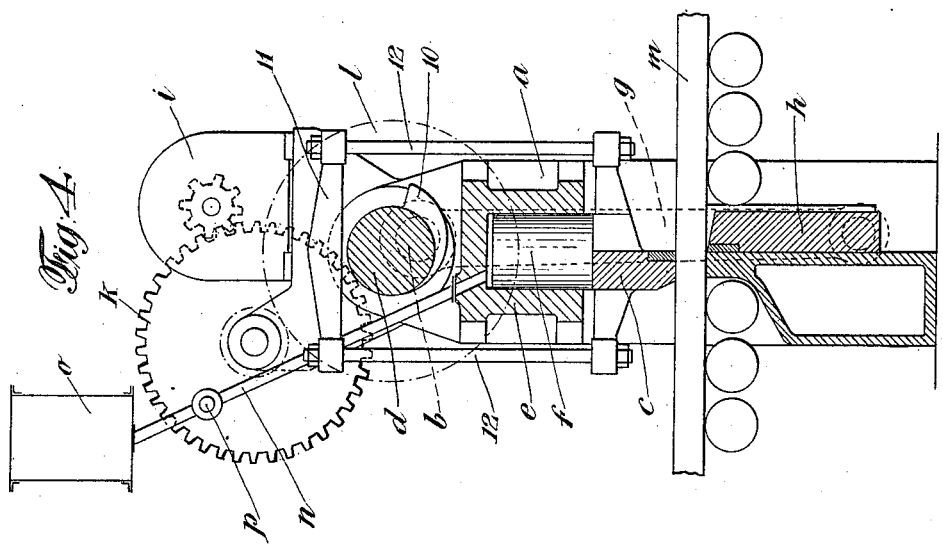
Witnesses:
John E. Prager
A. Worden Gibbs
Emil Sauter Inventor:
By his Attorney

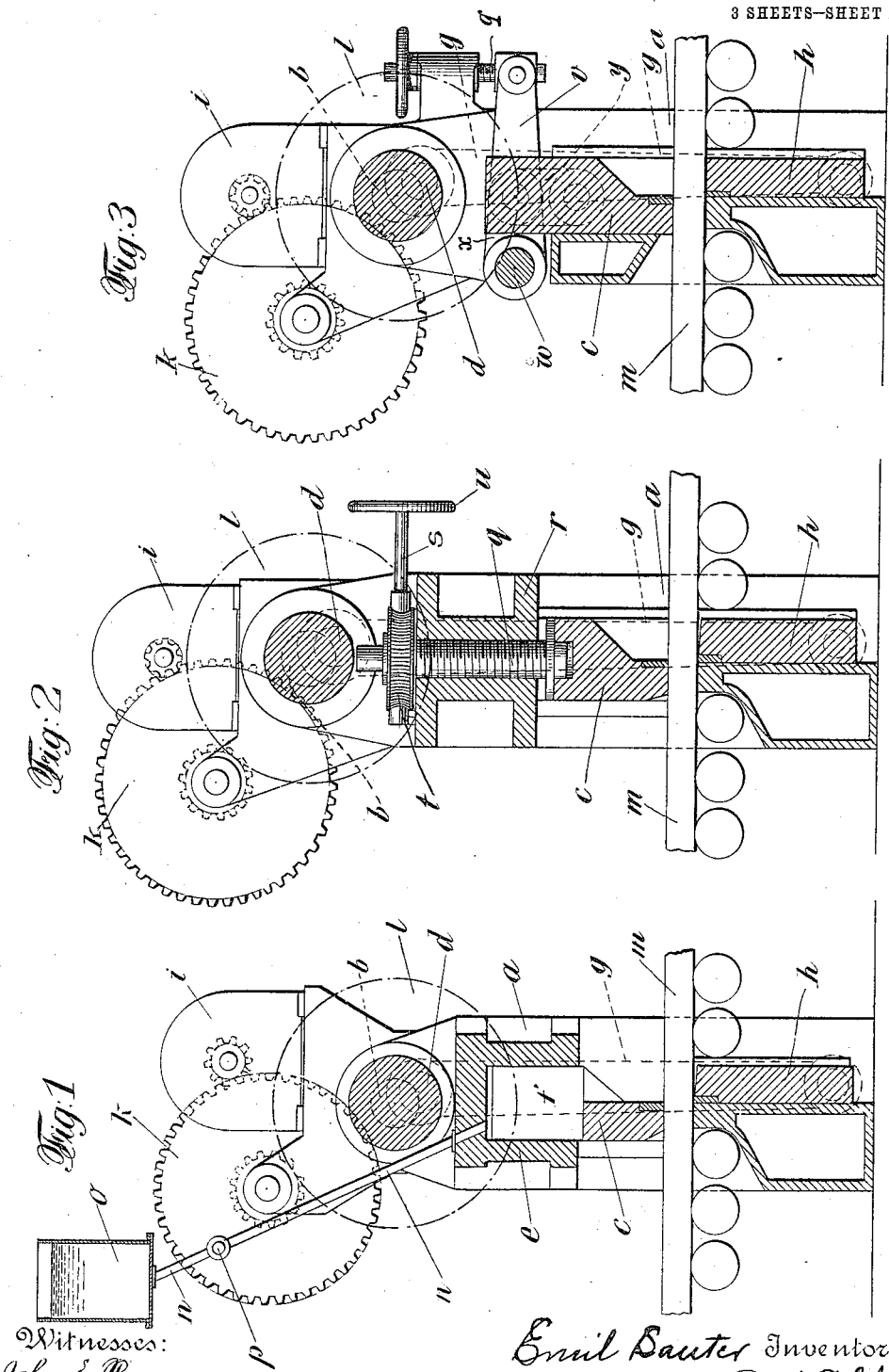

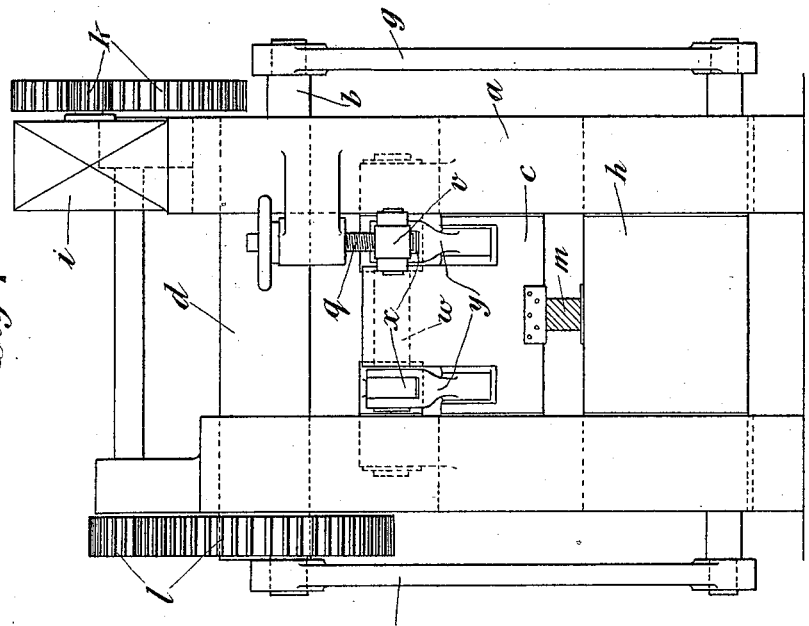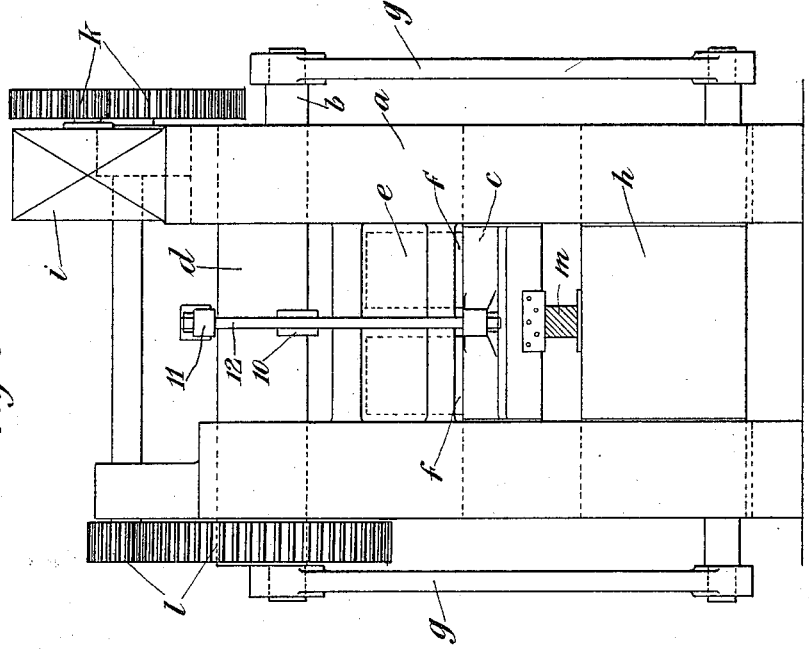

UNITED STATES PATENT OFFICE.

EMIL SAUTER, OF ESSEN-ON-THE-RUHR, GERMANY.

SHEARING-MACHINE.

1,045,802.  Specification of Letters Patent.  Patented Nov. 26, 1912.

Original application filed February 9, 1910, Serial No. 542,904. Divided and this application filed August 3, 1911. Serial No. 642,106.

*To all whom it may concern:*

Be it known that I, EMIL SAUTER, a subject of the German Emperor, and a resident of Essen-on-the-Ruhr, Germany, have invented certain new and useful Improvements in Shearing-Machines, of which the following is a specification.

The invention relates to a mechanically operated shearing machine for cutting blocks, rods and the like, and in which both the upper and lower cutter carriers are movable, being adapted to approach and recede from each other.

It has for its object to operate both of the carriers in such a manner that one of the two cutters is first brought into contact with the work to be cut, the other remaining stationary during this period, after which the said second cutter approaches the said first cutter and effects the cutting.

In the accompanying drawings—Figure 1 is a vertical section of a shearing machine and sets forth a hydraulic adjustment of one of the cutter carriers. Fig. 2 is a vertical section of a shearing machine in which a mechanical adjustment of the cutter carrier is effected. Fig. 3 illustrates a modification in the mechanical adjustment. Fig. 4 is a vertical section illustrating mechanical means for returning the cutter carrier. Fig. 5 is a vertical section illustrating hydraulic means for returning the cutter carrier. Fig. 6 is a front elevation of a shearing machine similar to that illustrated in Fig. 4, but provided with a plurality of plungers. Fig. 7 is a front elevation of the shearing machine shown in Fig. 3.

Similar characters of reference designate corresponding parts throughout the several views.

In the shearing machines herein illustrated, a crank shaft $b$ is mounted in a support $a$. This crank shaft operates, through the medium of the crank pin $d$ and the connecting rod $g$, the cutter carrier $h$ for the lower cutter.

In the support, Figs. 1, 4 and 5, is mounted a cylinder $e$ within which is a plunger $f$ resting upon the carrier $c$ for the upper cutter. The two carriers $c$ and $h$ are guided in the support $a$. The cylinder $e$ is connected by means of suitable pipe $n$ to a liquid containing receptacle $o$; and in the pipe $n$ is provided a valve $p$.

When the machine is to be operated, the carrier $c$ is first lowered upon the block $m$ by opening and then again closing the valve $p$. The crank $b$ is then rotated by suitable means such, for example, as the motor $i$ and the intermediate gear wheels $k$ $l$, whereupon the lower cutter is moved toward the upper cutter and the block cut. During the cutting operation, the upper cutter is prevented from rising by the hydraulic means set forth, the said plunger $f$ being locked in its lowermost position through the closing of the valve $p$. As soon as the block has been cut, however, the valve $p$ is again opened. The carrier $h$ then returns to its initial position; and the carrier $c$, with the plunger $f$, is suitably raised by a cam 10, Figs. 4 and 6, secured to the shaft $b$, said cam being adapted to engage a cross-head 11 secured by means of rods 12 to the upper carrier $c$. In Fig. 5 is illustrated a cross-head 11 connected by means of a piston rod 13 to a piston 14 of a hydraulic cylinder 15. A suitable fluid to raise said piston 14 and thereby the carrier $c$ is supplied to the cylinder 15 through a pipe 16. In Fig. 6, a plurality of plungers $f$ are shown as bearing upon the carrier $c$.

In Fig. 2, the upper carrier $c$ is connected to a screw spindle $q$, the nuts of which are mounted in a transverse member $r$ of the frame $a$ and which spindle is rotated by suitable means such for example as a worm $s$ and worm-wheel $t$ operated by a hand-wheel $u$. This hand-wheel while operating the worm $s$ might, of course, be actuated mechanically instead of manually.

In Figs. 3 and 7, a spindle $q$ is shown connected to a lever $v$ which is keyed to a shaft $w$ traversing the whole width of the shearing machine. On this shaft are also keyed levers $x$ which are connected by arms $y$ or other suitable means to the cutter carrier $c$ of the upper cutter, whereby the same may be adjusted as required through the spindle $q$.

When an object of a different size than usual is to be cut by the machine, the upper cutter carrier is adjusted to the correct position, and it is kept in this position until an object of another size is to be operated upon. It will be understood that the nuts could be rotated instead of the spindles, but the operation in this case would be the same.

This application is a division of a prior application made by me the 9th day of February, 1910, bearing the Serial No. 542,904, and in which the matter was originally shown and described, but not specifically claimed.

I claim:—

1. In a shearing machine for cutting blocks, rods and the like: two carriers adapted to approach and recede from each other, and suitable cutters carried thereby; means to move one of said carriers to bring its cutter to the work to be cut, and to lock the same in this position; and means to mechanically move the other of said carriers toward said first carrier to cause its cutter to effect the cutting.

2. In a shearing machine for cutting blocks, rods and the like: two carriers adapted to approach and recede from each other, and suitable cutters carried thereby; means to move one of said carriers to bring its cutter to the work to be cut, and to lock the same in this position, suitable rotating driving mechanism; and means connecting the same with said second carrier to move the latter toward said first carrier and cause its cutter to effect the cutting.

3. In a shearing machine for cutting blocks, rods and the like: an upper and lower carrier adapted to approach and recede from each other, and suitable coöperating cutters carried thereby; a rock shaft, and a plurality of levers rocking therewith; links connecting said levers to the upper carrier; an operating lever extending from said rock shaft; means to adjust said operating lever to move said upper carrier to bring the cutter to the work to be cut, and to lock the same in this position; and means to mechanically move the other carrier toward said first carrier to cause its said cutter to effect the cutting.

Signed at Cologne Germany this 17th day of July A. D. 1911.

EMIL SAUTER.

Witnesses:
 BESSIE F. DUNLAP,
 LOUIS VANDORY.

Copies of this patent may be obtained for five cents each, by addressing the "Commissioner of Patents, Washington, D. C."